United States Patent [19]

VanDenberg

[11] Patent Number: 4,504,080

[45] Date of Patent: Mar. 12, 1985

[54] LEAF SPRING LIFT AXLE SUSPENSION SYSTEM

[75] Inventor: Ervin K. VanDenberg, Massilon, Ohio

[73] Assignee: Turner Quick-Lift Corporation, Canton, Ohio

[21] Appl. No.: 494,825

[22] Filed: May 16, 1983

[51] Int. Cl.³ .............................................. B60G 11/46
[52] U.S. Cl. ........................................ 280/704; 267/45
[58] Field of Search ............... 280/704, 694, 699, 718; 267/36 R, 44, 45, 47, 19 R; 105/215 C

[56] References Cited

U.S. PATENT DOCUMENTS

| | | | |
|---|---|---|---|
| 1,819,548 | 8/1931 | Erickson | 267/45 |
| 3,285,621 | 11/1966 | Turner, Jr. | 280/81 |
| 4,102,424 | 7/1978 | Heinze | 280/704 |
| 4,134,604 | 1/1979 | Jackson | 280/704 |
| 4,166,639 | 9/1979 | Taylor | 280/704 |
| 4,373,738 | 2/1973 | Lange | 280/704 |

Primary Examiner—Richard A. Bertsch
Attorney, Agent, or Firm—Geoffrey R. Myers

[57] ABSTRACT

An upwardly biasing back-to-back, quarter-elliptic, diverging pair of leaf springs are employed as the lifting mechanism in a lift axle suspension system for wheeled vehicles. The springs normally bias the lift axle off of the road surface. By inflation of air bags, the wheels are lowered into engagement with the road surface against the normal upward bias of the leaf springs. Release of the air automatically retracts the wheels to their riding, lift position.

11 Claims, 3 Drawing Figures

LEAF SPRING LIFT AXLE SUSPENSION SYSTEM

BACKGROUND OF THE INVENTION

This invention relates to axle suspension systems for wheeled vehicles. More particularly, this invention relates to lift axle suspension systems used as auxiliary systems on vehicles already having a non-lift axle suspension as its primary means of support.

Lift axle suspension systems have been used in the medium and heavy-duty trucking industry in this country, on a regular commercial basis, for approximately three decades. Two of the earliest, successful, and reliable lift axle suspension systems were produced by the Neway Corporation and the Granning Corporation. These suspensions employed as the lifting mechanism an expandable and retractable air bag system, such that one air bag would be expanded to lower, while another air bag would be expanded to raise the auxiliary wheels from the road surface. While these systems found, and still do find, commercial acceptance, they are limited in their application primarily because of their bulk and design, which either prohibits use in a certain location or requires rearrangement of other components on the vehicle, in order to accommodate their structure. Neither system, furthermore, automatically lifts or normally biases the axle from the road surface. Rather, the position of the axle is dependent upon the inflation of an air bag system and the retention of air in that system. Accidental loss of air, such as would occur during air bag puncture, can result in the system dropping, by gravity, to the road surface or staying on the road surface if originally there.

An early attempt at providing an upward biasing means to automatically lift and normally hold the wheels off of the road surface may be found in U.S. Pat. No. 3,093,388. The device shown in that patent has found little or no commercial use or success. It comprises a series of coil springs located across the rear of the axle, adapted to what is known in the industry as the "Neway" beam-type "air-ride" suspension system. In order to provide the lifting mechanism in this patent, both coil springs and a torque bar running laterally across the vehicle are used. A shock absorber is employed, as well as air bags located at one end of the beam. Both the coil springs and torque bar required for lifting would often interfere with other mechanisms on the vehicle, such as if the suspension were to be located in the "pusher" (i.e. ahead of the drive axle and forwardly extending drive shaft). The coil springs are connected in such a manner in this design, furthermore, as to raise serious concerns as to their reliability under actual rugged operating conditions.

A major breakthrough in the lift axle suspension art was experienced with the advent of the invention found in U.S. Pat. No. 3,285,621. As shown in the drawings of that patent, a semi-elliptic leaf spring is connected at its ends to the frame member of the vehicle. Juxtapositioned between this spring and the frame of the vehicle, is an expandable and retractable air bag system. The multi-leaf leaf spring normally biases the axle off of the road surface, the axle being connected intermediate the ends of the spring. When the air bag system is expanded, it pushes down against the upward bias of the leaf springs, placing the wheel in road engaging position. Upon release of the air, the wheels are automatically returned by the leaf spring bias to their lifted position. By the use of this simple, yet uniquely synergistic design, a new dimension in lift axle suspension systems was created. Commercial success was virtually immediate and continues to this day.

The system shown in this patent can be ubiquitously used in all positions on the vehicle, particularly in the important and safe position known as the "pusher" position, as described above. This is because the lifting mechanism, namely, the longitudinally extending leaf springs, are located adjacent the frame members of the vehicle, thus presenting no interference problem with the drive shaft, etc., of the vehicle. In addition, air bag puncture (or other air loss) results in automatic lifting of the failed system from the road surface. Still further, since the leaf springs are non-load bearing, they can be designed to be of lesser weight, yet still serve the important safety features of stabilizing and shock absorbing.

While the invention disclosed in U.S. Pat. No. 3,285,621 continues to remain a highly effective system, it has been recognized in recent years that the use of a semi-elliptic leaf spring connected at its ends to the frame of the vehicle, can at times be a drawback—prohibiting its use on certain modern, medium and heavy-duty trucks whose frame lengths and componentry can not easily accommodate, if at all, the semi-elliptic spring. It has also been recognized, with the advent of higher load carrying capabilities in modern trucks, that the unit illustrated in the aforesaid patent must be modified to accommodate these higher load bearing requirements.

Exemplary of various improving modifications made in later years to the basic invention of U.S. Pat. No. 3,285,621, are those found in:

U.S. Pat. Nos. 3,617,072, 3,730,549, 3,877,718, 3,861,708, 3,902,734, 3,904,220, 4,000,913.

Among these patents is U.S. Pat. No. 3,904,220 which deals specifically with the concept of shortening the overall length characteristics of the lift axle unit illustrated in U.S. Pat. No. 3,285,621, by way of certain geometry considerations in the air bag and leaf spring system. While this concept has proven useful and commercially successful, it still employs a semi-elliptic spring, and thus, while reducing the overall length of the system, still presents a spacing problem on certain modern truck chassis designs.

Attempts have been made to employ quarter-elliptic leaf springs to achieve the benefits and characteristics of the basic unit illustrated in U.S. Pat. No. 3,285,621 and thereby, inherently, in some instances, to reduce the overall length of the system that would otherwise exist if a semi-elliptic spring were employed. Such use of quarter-elliptic leaf springs may be found, for example, in a unit known as the "Page L-25", produced at one time by the Page Division of Dura Corporation, or as another example, in U.S. Pat. No. 3,751,066. Commercial examples of this latter concept include the Truckstell "Fastback" and the Bonnin and Silent Drive units (100B and "Challenger", respectively). While the first suspension employing an upwardly biased quarter-elliptic spring shortens somewhat the overall suspension design, and while the second tends to add little, if any, length to the basic "Neway" non-lift design, both require a substantial structure at the moment end of the spring in order to withstand the forces that are generated in the structure during use. Neither of these suspensions, furthermore, has proved to be anywhere near as commercially acceptable or successful as the basic semi-elliptic spring invention, and each has had some rather serious reliability problems reported in association therewith.

In recent years, the upwardly biasing coil spring concept suggested first in U.S. Pat. No. 3,093,388 discussed above, has been modified to make it more commercially acceptable and reliable, thereby to achieve relatively compact lift axle suspension designs used in tight vehicle frame situations. An example of such a modification is the "Neway" coil spring suspension (ARTA-5000 Series) which requires a somewhat elaborate mechanism for retaining the spring, and adds only a small amount of additional length to the basic non-lift Neway suspension. E-Z Ride (Harsco Corp.) and Dura Corp. have also marketed coil spring lift axle suspension systems which have achieved relatively compact dimensional characteristics, but which, like the others, employ coil springs, and thus, retain certain drawbacks inherent in their use (e.g. perceived lower reliability, less stability, no interleaf shock-absorbing friction, etc.), and which have never enjoyed the commercial acceptance of the leaf spring concept.

From the above, it can be seen that there currently exists a need in the art for a reliable, and yet effective, lift axle suspension mechanism which has the unique advantages of a leaf spring suspension, but which, at the same time, avoids not only the problems associated with the coil spring mechanism, but also with the length problems involved in using a semi-elliptic leaf spring, as well as the structural problems associated with using a quarter-elliptic spring.

It is the purpose of this invention to fulfill this and other needs which will become more apparent to the skilled artisan, once given the following disclosure:

Generally speaking, this invention fulfills the above-described needs by providing in a lift axle suspension system for a frame-membered wheeled vehicle, including normally upwardly biasing means for raising a wheel-bearing axle of the vehicle from the road surface, and means for lowering the wheel-bearing axle into road surface engagement by acting against the normal bias of the normally upwardly biasing means, the improvement comprising as the normally upwardly biasing means, a first and second leaf spring connected at one of their ends to each other, the first leaf spring having its opposite end connectable to the frame of the vehicle, and the second leaf spring having its opposite end connectable to the wheel-bearing axle.

By providing such a suspension system, particularly in the preferred embodiments where the two leaf springs are back-to-back, quarter-elliptic springs, with their main (longest) leaves being directly connected to each other, the remaining leaves diverging in length as one proceeds away from the connection, accompanied by the appropriate structure, there is achieved a highly advantageous and unique lift mechanism, which when employed as the upward biasing means in a lift axle suspension system, achieves unique and synergistic results.

This invention will now be described with respect to certain embodiments thereof as illustrated in the accompanying drawings, wherein:

IN THE DRAWINGS

DETAILED DESCRIPTION OF THE DRAWINGS

Figure 1:
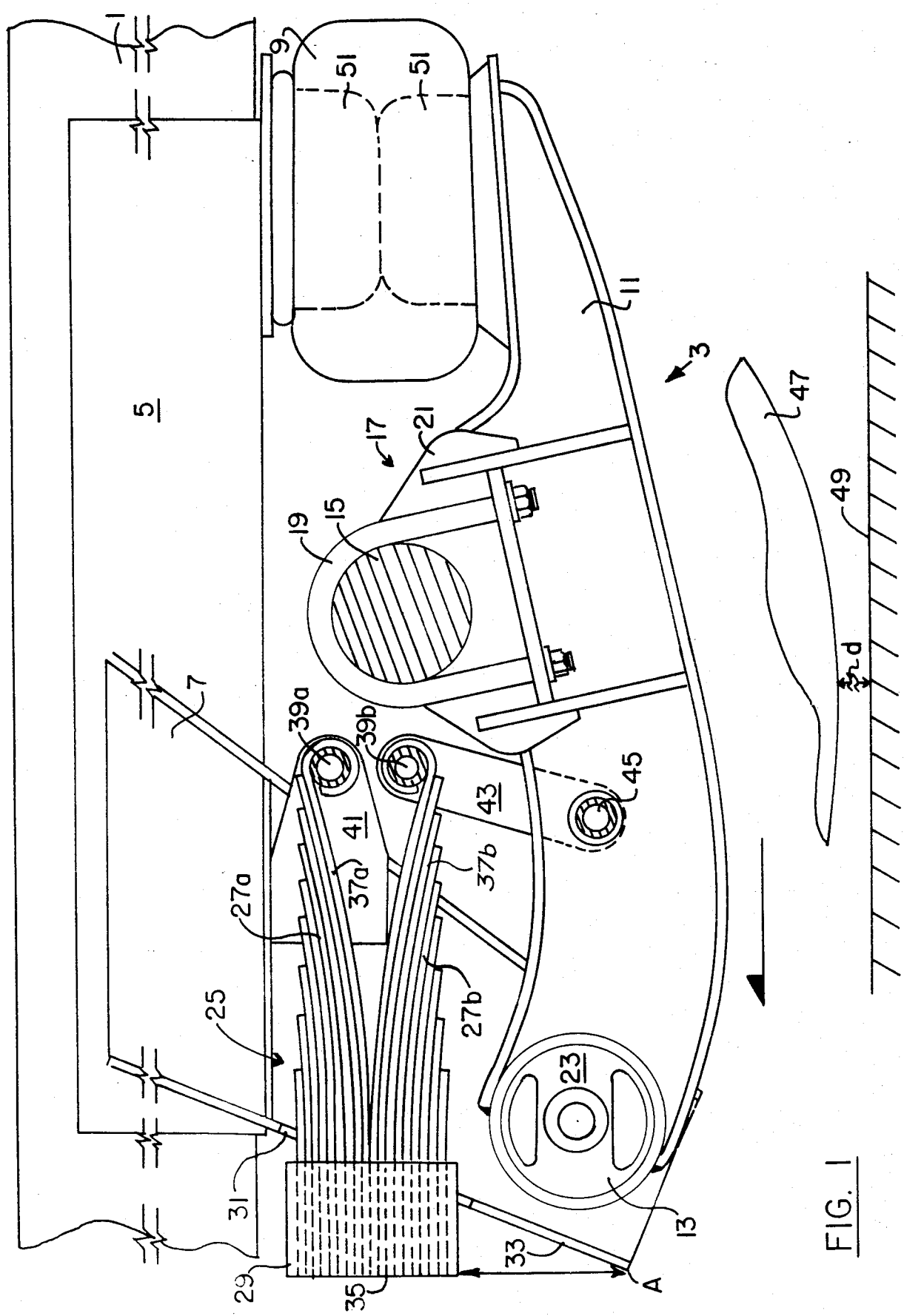
FIG. 1 is a side plan, partially sectionalized view of an embodiment of this invention, shown in its "up" position.

FIG. 1 illustrates an embodiment of this invention postured in its "up" or riding position. In this figure, there is shown a longitudinally extending frame member 1 of a typical medium or heavy-duty truck or trailer (not shown for convenience). Such a truck or trailer is, of course, provided with other wheel-bearing axle suspension systems that form the primary means for the vehicle's support. Then in accordance with this invention, there is provided lift axle suspension 3 located, for example, in the "pusher" position.

Lift axle suspension 3 is connected to longitudinally extending frame member 1 by way of a longitudinally extending bracket 5 which joins the ends of the suspension system so that it can be manufactured and shipped in a generally unitized condition. This simplifies the installation of the suspension.

Extending from bracket 5 is hanger bracket 7 and retractable and expandable air bag assembly 9. Air bag assembly 9 is of conventional design, and is expandable and retractable by use of a conventional air system tapped, usually from the air brake system, with its control mechanism being located in the cab of the vehicle, in accordance with known lift axle technology. Since such features are conventional in the industry and are described in one or more of the above-referenced patents, they are not shown herein for convenience.

Extending between air bags 9 and hanger bracket 7 is beam assembly 11 which has, as illustrated, air bag 9 located at one end and, by way of pivotal connection 13, has attached thereto hanger bracket 7 at its other end. While pivotal connection 13 may be of any conventional design, it is preferred for the purposes of this invention, that such a connection be formed in accordance with the teachings of U.S. Pat. No. 4,166,640, the text of which is incorporated herein by reference.

Located intermediate the ends of beam assembly 11 is lift axle 15. Lift axle 15 is connected by any conventional axle connecting mechanism 17 to the beam. Such a mechanism, as illustrated, may include a U-bolt arrangement 19 coupled with an axle-saddle connection member 21. In such an arrangement, the axle is usually rigidly connected to the system, not just by the U-bolts, but by way of welds (not shown) to the axle-saddle connection member 21. This is done in combination with pivotal connection 13 which takes up the articulation forces of the suspension at its large bushing 23 located within pivotal connection 13.

To this point, as can be seen, the axle suspension system 3 of this embodiment bears only the length of the beam structure which, by design, is engineered so as to carry the required load of the vehicle. Thus, the suspension at this point, therefore, constitutes a relatively short, proven reliable, non-lift axle suspension system such as that shown, for example, in the aforesaid U.S. Pat. No. 4,166,640. Now, in accordance with the teachings of this invention, and without adding to the overall length of the relatively short suspension system as shown, suspension 3 is conveniently formed into a very effective and reliable lift axle suspension system, by the addition of spring arrangement 25.

Figure 2:
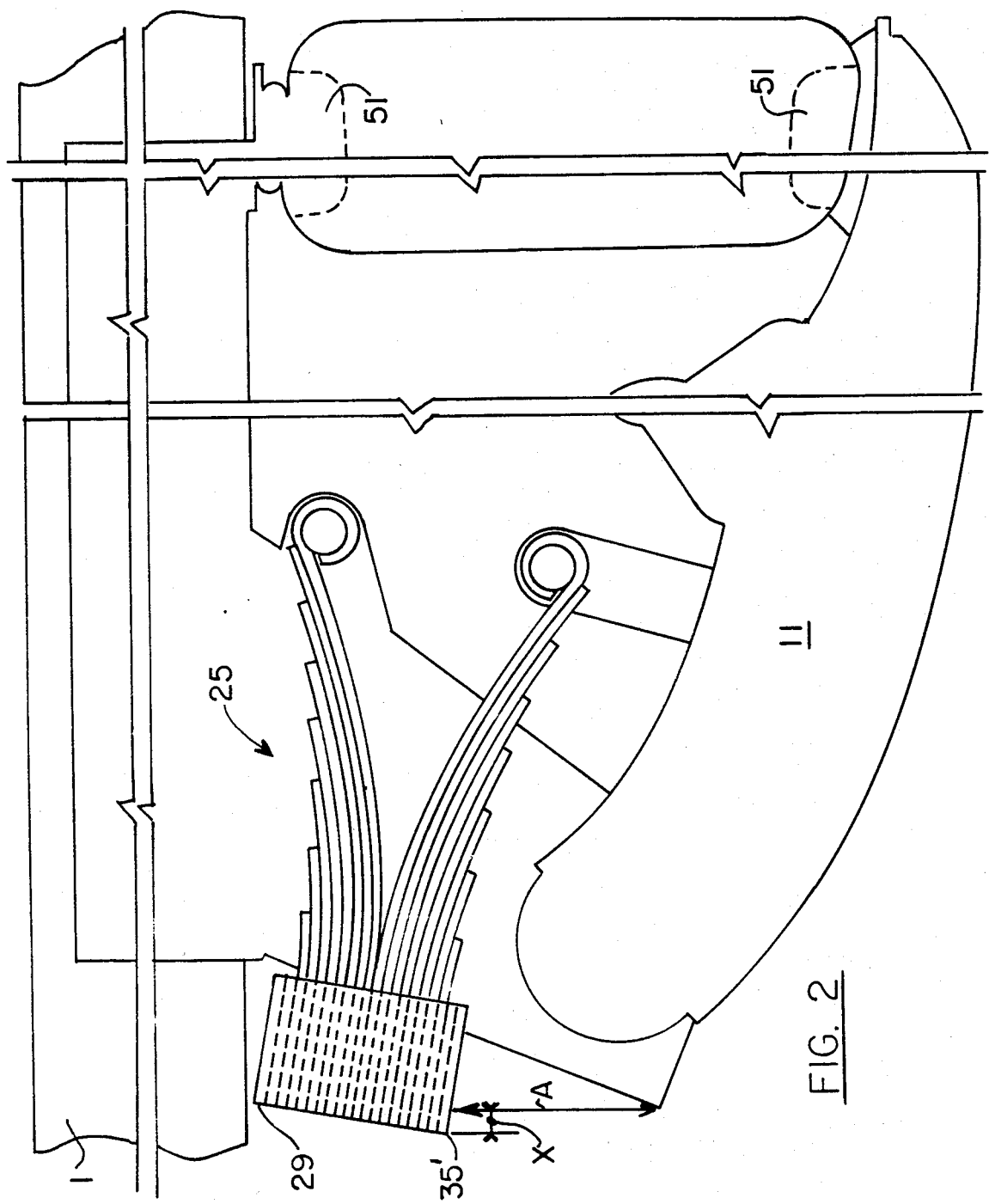
FIG. 2 is the same view as FIG. 1 except illustrating the embodiment in its "down" position.

Spring arrangement 25 is comprised of a pair of back-to-back, quarter-elliptic leaf springs 27a and b. Quarter-elliptic springs 27a and 27b, as illustrated, are connected at their thickest most end by way of a compression frame 29 located in orifice 31 located in the forward plate of hanger bracket 7. As can be seen, leading edge 35 of compression frame 29 when in the "up" position, does not extend substantially beyond forward most vertical plane "A" of bracket 7, thereby not extending the overall length of the system. As shown in FIG. 2, when in the "down" position, leading edge 35' extends only a very small distance "X" beyond plane "A", thus adding no eignificant length to the suspension. If distance "X" presents a problem, it is simply eliminated by locating spring assembly 25 further rearward, thereby to insure that edge 35 at its forwardmost point remains rearward of plane "A".

Quarter-elliptic springs 27a and 27b are aligned so that spring 27a is immediately above spring 27b. In addition, these springs are formed in a diverging manner so as to form a substantially "V-shaped" construction wherein the longest leaves 37a and 37b are directly connected, back-to-back, to one another. Then, in diverging fashion, each successively smaller leaf of each spring 27a and 27b is located in descending fashion, so as to form the configuration as illustrated. In such a manner, spring arrangement 25 provides for a normal upward biasing of the axle from the road surface.

The normal upward bias of the leaf springs 27a and 27b is formed in part by way of the connection of largest leaves 37a and 37b to their respective connections 39a and 39b. Connections 39a and 39b are each pivotal connections. However, connection 39a is located by way of bracket member 41, so as to be connected directly to hanger bracket 7 and, thus, of course, to frame member 1. In turn, connection 39b is pivotally connected to plate member 43 at one of its ends. At the other end of plate member 43, there is a similar connection 45 pivotally connecting plate member 43 to beam 11, and thus, in turn, to rigidly connected axle 15. By proper and conventional use of engineering techniques, taking into account the weight of the suspension system, spring assembly 25 is readily designed so as to bias and hold wheels 47 at a distance "d" above the road surface 49. Due to the upward biasing of the spring arrangement at 25, resilient "bouncing" of the wheel assembly is minimized to the point of being eliminated as any kind of a problem.

In the preferred embodiments of this invention, which allow suspension 3 to safely carry 18,000 lbs. or more, springs 37a and 37b are conveniently formed of nine (9) leaves each. It is understood, of course, that the number of leaves may vary greatly as different systems, and different load-carrying capacities are designed and/or accommodated.

Figure 3:
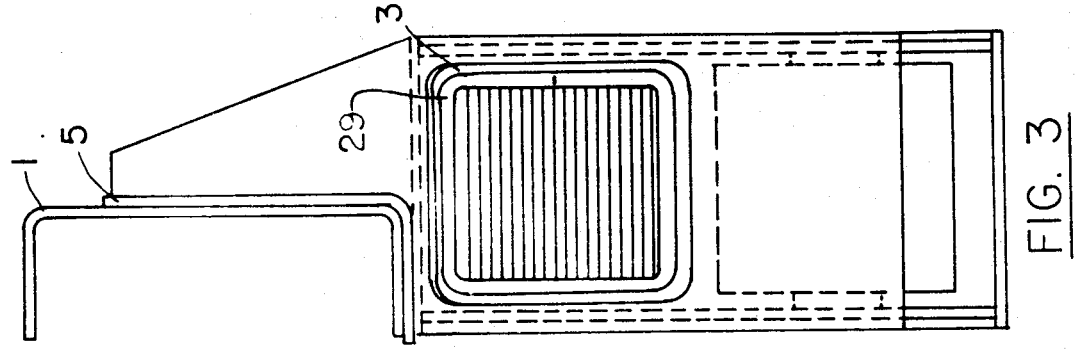
FIG. 3 is a front plan view of the embodiment of FIG. 1.

FIG. 3 illustrates the nature of compression frame 29 and its location within orifice 31. As can be seen, compression frame 29 does not contact the forward most plate 33 of hanger bracket 7, although there is no real reason why it could not. It is merely a design feature of the nature of the springs involved, that they reside substantially intermediate the orifice 31 because of the biasing nature of the two back-to-back springs.

Reference to FIG. 2 shows the system in its "down" or road-engaging position. As can be seen, spring assembly 25 has been fixed by the expansion of air bags 9 such that the ends of springs 27a and 27b connected to respective connections 39a and 39b have diverged from one another, making, more dramatic the "V-shaped" nature of the spring assembly, and heightening the upward bias forces of the spring assembly 25.

The contrast between FIG. 1 and FIG. 2 illustrates the operation of lift axle suspension 3. As stated above, FIG. 1 shows the suspension in its "up" position, such as would be assumed when the vehicle is unloaded and the auxiliary wheels 47 are not needed. It is, of course, understood in the above description, that the drawings only illustrate one side of the vehicle, the other side being the same in that each of the two longitudinally extending frame members 1 of the vehicle bear such a suspension with the inner connection being the laterally extending axle 15 across the body of the vehicle. In the "up" position, as shown in FIG. 1, air bags 9 are deflated of air (by way of the control in the cab), thus, allowing spring assembly 25 to retract to its uppermost position, in accordance with the upward bias of the spring assembly 25 acting against the weight of the suspension as it pivots about pivot connection 13. The uppermost position is preferably determined by the bottoming out of rubber bumpers 51 conventionally found in air bags 9. In such a posture, the still present preset upward bias of the spring assembly 25 holds wheels 47 firmly in their "up" position.

When it is desired to place wheels 47 into engagement with road 49, the control in the cab of the vehicle is manipulated so as to provide sufficient air (e.g. 90-100 psi) to air bags 9, thereby to expand air bags 9 (see FIG. 2) which, in turn, force beam 11 to pivot about pivotal connection 13, all against the upward bias of spring assembly 25, until wheels 47 contact road surface 49. In such a fashion, and when in road engagement (FIG. 2), the high reliability of a beam-type suspension system, such as has been conventionally known in the industry since at least the 1950's, is achieved. In addition, the high reliability of the improvements of such a beam-type suspension system as found in U.S. Pat. No. 4,166,640, are also achieved. Then, when it is desired to lift suspension system 3, air is merely deflated (by way of the same controls) from air bags 9, in which event the normal upward bias of spring assembly 25 automatically lift wheels 47 from engagement with road surface 49, to their design height "d" as shown in FIG. 1.

As can be seen from the above description, the reliability of a beam-type suspension has been achieved without adding to it either undesirable length, or a lifting mechanism which would interfere with the drive shaft or other elements located in the central portion between the two frames 1 of the vehicle. This is accomplished by way of locating spring assembly 25 substantially directly under frame members 1, or slightly outboard thereof (see FIG. 3) such that the interior of the suspension extending between frame members 1 is open to the drive shaft of the vehicle. In this respect, and in accordance with standard recognized techniques, axle 15 may be a "drop-axle" to accommodate the drive shaft of the vehicle (not shown for convenience). It can also be seen that many of the advantages of the leaf spring lift concept, as discussed above, have been achieved, while at the same time reducing overall length but eliminating the problems attendant previous uses of quarter-elliptic or coil springs.

In this respect, while the subject invention as illustrated does embody the use of a beam assembly 11, thereby not achieving the elimination of such a beam through the use of a semi-elliptic leaf spring connected at its ends, such as is illustrated in U.S. Pat. No. 3,285,621, nevertheless, it does employ the concept of an interleafed leaf spring, thus eliminating the necessity of using, in most circumstances, a shock absorber extending between the beam and the frame. In addition, it is to be noted that by the use of the upwardly biased spring connection assembly 25, the achievement of an automatic lifting system in case of air bag failure is achieved, for the safety of the driver, and through such a connection improved moment arm end connections are achieved.

Once given the above description, many other features, modifications, and improvements will become apparent to the skilled artisan. Such other features, modifications, and improvements are considered, therefore, to be a part of this invention, the scope of which is to be determined by the following claims:

I claim:

1. In a lift axle suspension system for a frame membered wheeled vehicle, including normally upwardly biasing means for raising a wheel-bearing axle of said vehicle from the road surface and means for lowering the wheel-bearing axle into road surface engagement by acting against the normal bias of said normally upwardly biasing means, the improvement comprising as said normally upwardly biasing means:
a first and second leaf spring connected at one of their ends to each other;
said first leaf spring having its opposite end connected to the frame of the vehicle; and
said second leaf spring having its opposite end connected to the wheel-bearing axle.

2. A lift axle suspension system according to claim 1 wherein said first and second leaf springs are quarter-elliptic leaf springs connected directly together in back-to-back fashion at one end to each other, thereby to form a substantially "V-shaped" configuration.

3. A lift axle suspension system according to claims 1 or 2 wherein said first leaf spring is located above said second leaf spring and the said opposite end of said second leaf spring connected to said axle diverges from said opposite end of said first leaf spring connected to said frame of the vehicle during lowering of the axle and converges during raising of the axle.

4. A lift axle suspension system according to claim 3 wherein said leaf springs have a plurality of leaves of different lengths, said leaf springs being connected in a back-to-back manner such that the longest leaf of each of said springs is adjacent its counterpart in the other spring, and the remaining leaves of each spring are stacked therefrom in descending order according to their length.

5. A lift axle suspension system according to claim 4 wherein said suspension further includes a beam connected to said axle, wherein said means for lowering the wheel-bearing axle comprises an expandable air bags means connected to said beam, and wherein the opposite end of said second leaf spring is connected to said beam.

6. A lift axle suspension system according to claim 5 wherein said beam is connected to said axle by means located intermediate its ends, said air bags means is located at one end of said beam, and said beam at its opposite end is pivotally connected to the frame of the vehicle.

7. A lift axle suspension system according to claims 1 or 2 wherein said suspension further includes a beam connected to said axle, wherein said means for lowering the wheel-bearing axle comprises an expandable air bags means connected to said beam, and wherein the opposite end of said second leaf spring is connected to said beam.

8. In a wheeled vehicle having longitudinally extending frame members on either side of the vehicle and at least one axle suspension system carrying road-engaging wheels which provide a primary means of vehicle support in combination with a lift axle suspension system carrying wheels for road surface engagement, and provided with a mechanism for raising said wheels above the road surface and lowering said wheels into engagement with the road surface, thereby to provide additional vehicle support, the improvement comprising as said lift axle suspension, the suspension of claims 1 or 2, wherein said suspension is attached to said longitudinally extending frame members of said vehicle.

9. The wheeled vehicle according to claim 8 wherein said vehicle has a pair of said longitudinally extending frame members, one on each side of said vehicle, and a pair of said connected first and second leaf springs, one associated with each of said frame members, each of said first leaf springs being located above its respective second leaf spring and the said opposite end of said second leaf spring being connected to said axle in such a manner as to diverge from said opposite end of said first leaf spring connected to said frame member during lowering of the axle and to converge during raising of the axle.

10. The wheeled vehicle according to claim 9 wherein said lift axle suspension further includes a pair of beams connected to said axle, one beam being associated with a respective frame member, and wherein said means for lowering the wheel-bearing axle comprises an expandable air bags means connected to said beams and located between said beams and a respective frame member, and wherein the opposite end of each of said second leaf springs is pivotally connected to a respective beam.

11. The wheeled vehicle according to claim 10 wherein said beam is connected to said axle by means located intermediate its ends, said air bags means being located at one end of said beam, and said beam being pivotally connected at its opposite end to a respective frame member of the vehicle.

* * * * *